(12) United States Patent
Fukuda et al.

(10) Patent No.: US 7,859,695 B2
(45) Date of Patent: Dec. 28, 2010

(54) REMOTE COPYING METHOD AND COMPUTER PROGRAM

(75) Inventors: Hikaru Fukuda, Tochigi (JP); Ikuo Ueno, Nagano (JP)

(73) Assignee: Panasonic Corporation, Osaka (JP)

( * ) Notice: Subject to any disclaimer, the term of this patent is extended or adjusted under 35 U.S.C. 154(b) by 1753 days.

(21) Appl. No.: 11/004,962

(22) Filed: Dec. 7, 2004

(65) Prior Publication Data

US 2005/0134914 A1 Jun. 23, 2005

(30) Foreign Application Priority Data

Dec. 18, 2003 (JP) ............... P2003-421348

(51) Int. Cl.
*G06F 3/12* (2006.01)
*H04N 1/00* (2006.01)

(52) U.S. Cl. ............ 358/1.15; 358/1.16; 358/1.17; 358/450; 358/540; 358/474; 709/201; 709/203

(58) Field of Classification Search .......... 358/1.9, 358/1.15, 400–406, 1.16, 1.17, 450, 474; 709/201, 203

See application file for complete search history.

(56) References Cited

U.S. PATENT DOCUMENTS

| | | | |
|---|---|---|---|
| 5,123,063 A | 6/1992 | Ohkubo | |
| 5,579,126 A | 11/1996 | Otsuka | |
| 5,892,587 A | 4/1999 | Okada et al. | |
| 5,896,203 A | 4/1999 | Shibata | |
| 6,301,016 B1 | 10/2001 | Matsueda et al. | |
| 6,348,971 B2 * | 2/2002 | Owa et al. | 358/1.15 |
| 6,377,580 B2 | 4/2002 | Matsumoto et al. | |
| 6,407,820 B1 * | 6/2002 | Hansen et al. | 358/1.12 |
| 6,433,892 B1 | 8/2002 | Yoshida | |
| 6,612,758 B2 | 9/2003 | Yokoyama | |
| 6,614,548 B1 | 9/2003 | Kisono | |
| 6,718,378 B1 | 4/2004 | Machida | |
| 6,785,022 B1 | 8/2004 | Todaka | |
| 6,897,987 B2 | 5/2005 | Nakamura et al. | |
| 6,906,829 B1 | 6/2005 | Kisono | |
| 6,992,789 B2 * | 1/2006 | Czyszczewski et al. | 358/1.18 |
| 7,038,795 B2 | 5/2006 | Kaneko et al. | |
| 7,233,416 B2 | 6/2007 | Kataoka | |
| 7,369,257 B2 * | 5/2008 | Enomoto et al. | 358/1.15 |
| 7,385,712 B2 * | 6/2008 | Nakagiri et al. | 358/1.12 |

(Continued)

FOREIGN PATENT DOCUMENTS

JP 8-018708 A 1/1996

(Continued)

OTHER PUBLICATIONS

JP 2001-024839 English Translation.*

(Continued)

*Primary Examiner*—Twyler L Haskins
*Assistant Examiner*—Dennis Dicker
(74) *Attorney, Agent, or Firm*—Greenblum & Bernstein, P.L.C.

(57) ABSTRACT

In the network system, which includes a scanner apparatus and a printer apparatus connected to network, the scanner apparatus scan the image of a plurality of pages of an original document, and the scanned image data is transmitted to the printer apparatus before the completion of scanning all of the plurality of original document pages.

4 Claims, 5 Drawing Sheets

U.S. PATENT DOCUMENTS

| | | | |
|---|---|---|---|
| 2001/0043365 A1* | 11/2001 | Kremer et al. | 358/1.16 |
| 2001/0051064 A1* | 12/2001 | Yokoyama | 400/70 |
| 2002/0044298 A1 | 4/2002 | Kaneko et al. | |
| 2003/0016392 A1 | 1/2003 | Kataoka | |
| 2003/0020940 A1 | 1/2003 | Nakamura et al. | |
| 2003/0133168 A1* | 7/2003 | Fresk et al. | 358/401 |
| 2003/0202220 A1* | 10/2003 | Sesek | 358/474 |
| 2004/0012811 A1* | 1/2004 | Nakayama | 358/1.15 |
| 2004/0042049 A1* | 3/2004 | Hulan et al. | 358/404 |
| 2004/0051911 A1* | 3/2004 | Yoshida et al. | 358/402 |
| 2004/0205169 A1 | 10/2004 | Machida | |
| 2006/0109498 A1* | 5/2006 | Ferlitsch | 358/1.15 |
| 2006/0139402 A1* | 6/2006 | Nakashima | 347/40 |

FOREIGN PATENT DOCUMENTS

| | | |
|---|---|---|
| JP | 8-336036 | 12/1996 |
| JP | 11-046295 | 2/1999 |
| JP | 11-146109 A | 5/1999 |
| JP | 11-168609 | 6/1999 |
| JP | 11-187165 | 7/1999 |
| JP | 2000-151869 | 5/2000 |
| JP | 2001-14255 | 1/2001 |
| JP | 2001-024839 | 1/2001 |
| JP | 2001-189824 | 7/2001 |
| JP | 2001-344162 | 12/2001 |
| JP | 2003-032476 A | 1/2003 |

OTHER PUBLICATIONS

U.S. Appl. No. 11/004,990 to Fukuda et al.
English language Abstract of JP 11-168609.
English language Abstract of JP2001-344162.
English language Abstract of JP 11-187165.
English language Abstract of JP 2000-151869.
English language Abstract of JP 2001-14255.
English Language Abstract of JP 2001-024839.
English Language Abstract of JP 8-336036.
English Language Abstract of JP 11-046295.
English Language Abstract of JP 2001-189824.
English language Abstract of JP 2003-032476 A.
English language Abstract of JP 11-146109 A.
English language Abstract of JP 8-018708 A.

* cited by examiner

REMOTE COPYING METHOD AND COMPUTER PROGRAM

BACKGROUND OF THE INVENTION

1. Field of the Invention

The present invention relates to a remote copying method which enables a remote copying function by controlling various devices such as network scanners, printers, and others, and to a computer program utilized for the remote copying method.

2. Description of Related Art

Presently, a hypothetical multifunction apparatus is on the network. The hypothetical multifunction apparatus can have desired functions, by appropriately combining devices based on desire of users. (Refer to Related Art 1).

In the above noted technology, a network includes multiple PCs, color scanners, monochrome scanners, color printers, monochrome printers, facsimile servers, facsimile devices, and multifunction controller apparatus. In order to configure the hypothetical multifunction apparatus on the network, the multifunction controller apparatus performs various tasks such as displaying the devices combining the devices, controlling operations and movements of the devices, as well as executing data transfer between devices. In addition, the multifunction controller apparatus displays an operation screen on each PC for the purpose of setting the combination of devices that configures the hypothetical multifunction apparatus.

[Related Art 1] Japanese Patent Laid Open Application 2001-344162

However, the conventional technology similar to the above disclosed Related Art 1 can only enable a user to accomplish a remote copying function on the network by selecting the appropriate scanner and printer in order to get the same result the user desires. The remote copying function has the same function as a single-unit copier. However, this method merely establishes an interface between devices, such as scanners, printers, PCs (Personal Computer), and others, and is no more than determining primarily a route for data transfer.

Therefore, to copy a plurality of documents using scanner, printer, PC, and other devices, has been a time consuming process due to the fact that the copying time reflects the total sum of each device's operating time and processing time. Thus, it has not been possible to realize an efficient copying function for a large volume of documents.

SUMMARY OF THE INVENTION

The present invention is based upon such an understanding, with the purpose of providing a remote copying method and a computer program utilized for the remote copying method, which enable an efficient copying function, even when the remote copying method is performed by using combined functions of a plurality of different devices connected on the network, and even when a large volume of document copying is required.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following, in reference to the above-described drawings.

Figure 1:
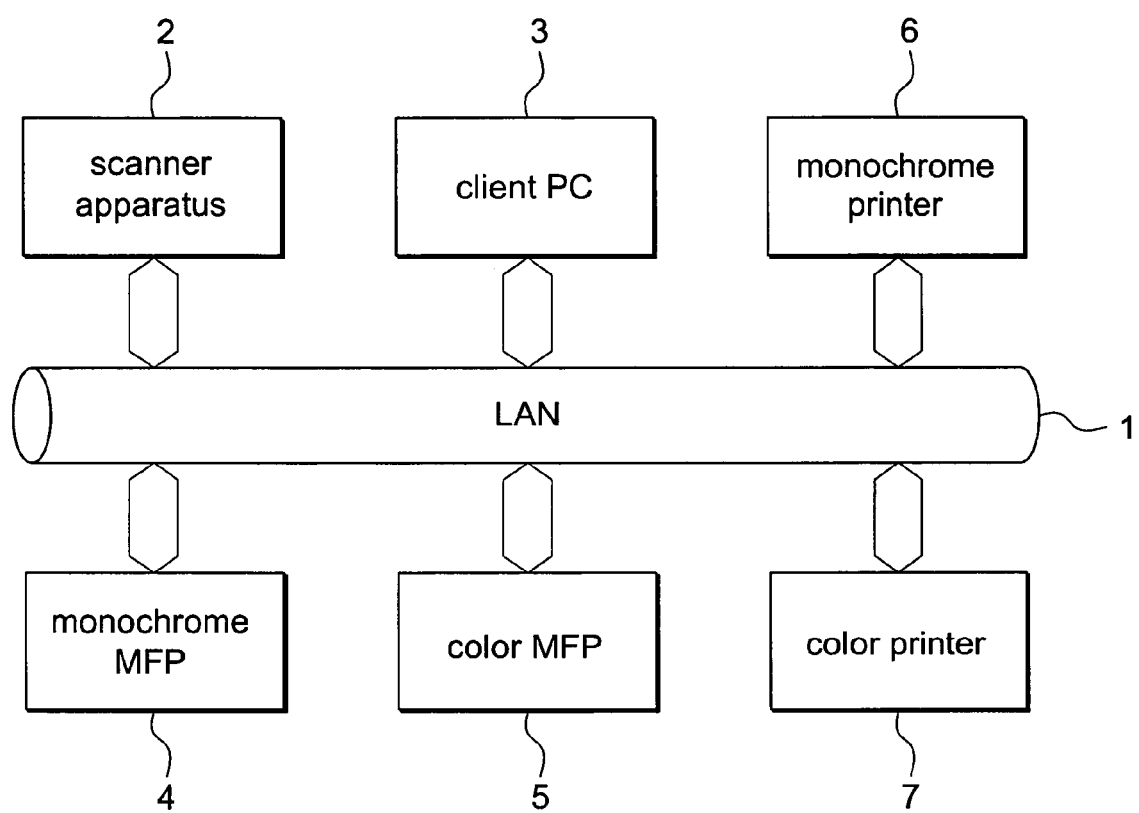
FIG. 1 is a block diagram illustrating a network system configuration to which a remote copying processing method of the present invention is applied.

FIG. 1 is a block diagram illustrating an example of the network configuration including a scanner apparatus, a client PC (Personal computer), and a printing apparatus, which are applied to the remote copying method. This network (LAN) 1 connects scanner apparatus 2, client PC (communication processing apparatus) 3, monochrome MPF (Multi Function Peripherals) 4, color MFP 5, monochrome printer 6, and color printer 7. Each device 2-7 has the capability of communicating to each other according to a predetermined communication protocol (e.g. TCP/IP (Transmission Control Protocol/Internet Protocol)). When performing a remote copying process, scanner apparatus 2 can transfer the scanned image data of the original document to specified devices having a printing function, based on the operating instruction, directly or through the client PC.

Figure 2:
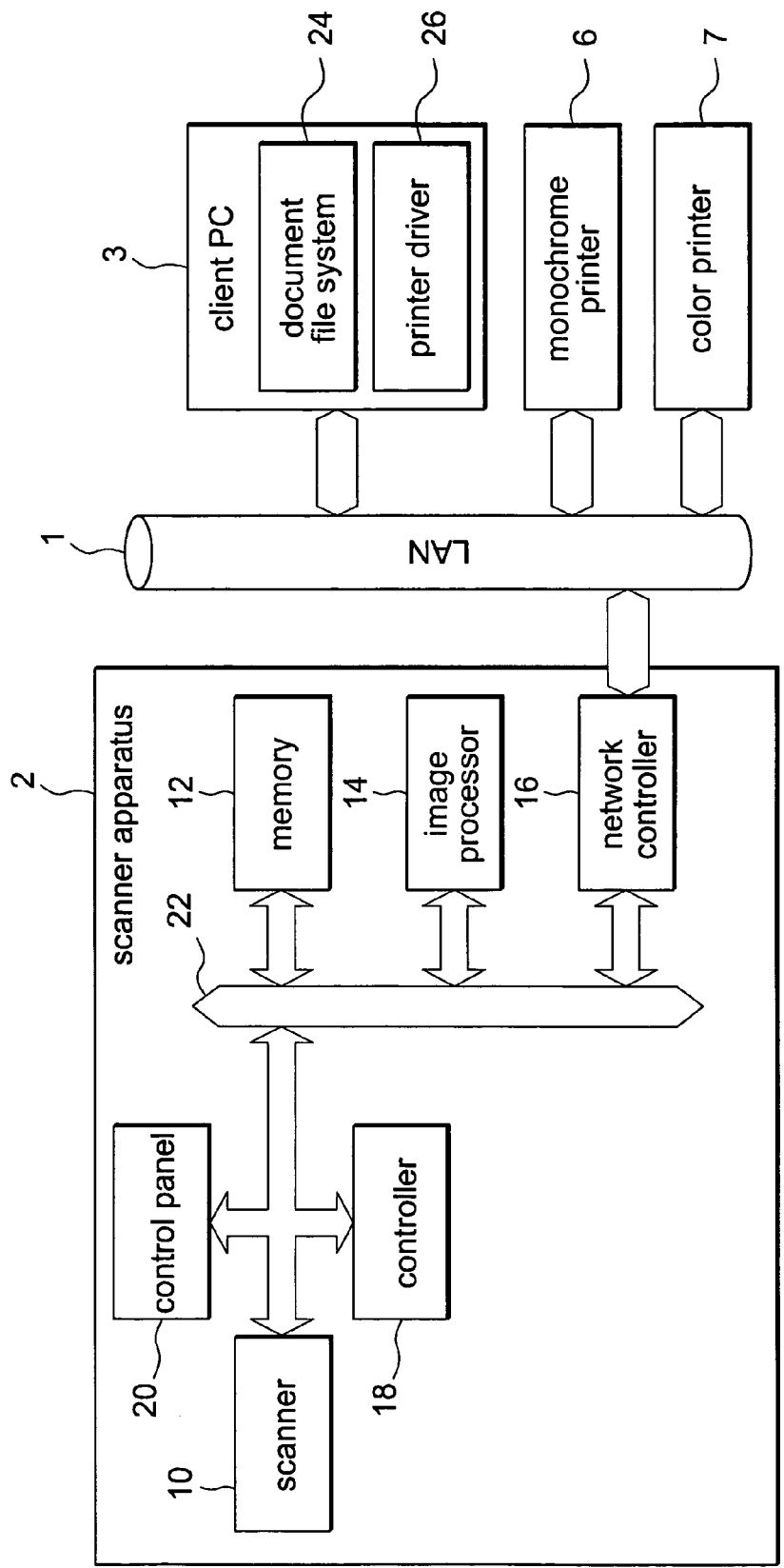
FIG. 2 is a block diagram illustrating a simplified configuration of the scanner apparatus, client PC, monochrome printing apparatus, and color printing apparatus described in FIG. 1.

FIG. 2 is a block diagram illustrating a general configuration of the scanner apparatus, the client PC, the monochrome printer, and the color printer shown in FIG. 1. Scanner apparatus 2 includes scanner 10, memory 12, image processor 14, network controller 16, controller 18, and control panel 20. Each of these main components is mutually connected through system bus 22.

Scanner 10 identifies information such as type (color/monochrome), size, and number of pages, of the original documents placed on the original document tray, and then optically scans the image data in sequence.

Memory 12 includes memory devices, such as flash memory, hard disk, and others. Memory 12 temporarily stores image data read by scanner 10, as well as image data after pre-transfer processing (data combining function (N into 1 copying function) and size reducing function).

Image processor 14 executes various image processing of image data stored in memory 12. For example, image processor 14 is able to combine, into one-page size, image data pertaining to a predetermined number of pages stored in memory 12, to generate such combined image data sequentially, and then to reduce the combined image data in size. In the combining function, images of a predetermined number of pages (e.g. two pages) are reduced in size and combined into one single page. (For example, images pertaining to two pages are reduced into a half page in size and are arranged parallel on one single page). According to circumstances, only combining of data image can be executed without the size reduction, and it is possible to generate a combined data image in a single page with enlarged paper size.

Network controller 16 controls the transmission and reception of image data, various commands, communications control signals and the like to/from the other devices connected to network 2.

Controller 18 is a central-processing device, controlling over the operation of the aforementioned devices.

Control panel 20, which allows an operator to input various commands and operational settings, is equipped with many operating keys (e.g. a numerical keypad, start button, and others), and with a display that displays various informational items. (e.g. liquid crystal display).

Also, client PC 3 includes document file system 24, that manages image data received from network scanner apparatus 2, as well as executing various operations such as data processing and image display; and printer driver (Remote Copying Processing Control Program) 26, that enables client PC 3 to setup the output operations for monochrome printer 6 and color printer 7, as well as providing necessary information to the operating system of client PC 3 for the output operation.

Moreover, monochrome printer 6 and color printer 7 are able to print out the image data received from scanner apparatus 2 directly or through client PC in monochrome or color.

In execution of the remote copying process by using the aforementioned devices, first, the original document, placed on the scanning tray, is scanned at scanner apparatus 2, and the image data (bit unit) is generated as a result of scanner 10 scanning the document. Then, the image data is sent to and stored in memory 12. Next, the stored image data is processed by image processor 14 according to a predetermined image processing (e.g., combining processing). The image data is compressed into a single page unit (for example, monochrome image data can converted into JBIG (Joint Bi-level Image experts Group) format, and color images into JPEG (Joint Photographic coding Experts Group) format). Controller 18 transfers the compressed image data to client PC 3 through network controller 16 without waiting for scanner 10 to complete scanning all pages of the original documents. At client 3, printer driver 26 automatically transfers the image data transferred from scanner apparatus 2, according to a predetermined output setting, to monochrome printer 6 or color printer 7. Furthermore, printing of the image data, transferred from client PC, 3 is executed at monochrome printer 6 or color printer 7.

Further, it is possible to perform the above mentioned remote copying process, by transferring the image data from scanner apparatus 2 to printers 6 and 7 without going through client PC 3 and printing the transferred image data at printers 6 and 7. In addition, the above remote copying process is not limited to the use of monochrome printer 6 or color printer 7 only, but is also possible by utilizing the printing function of monochrome MFP 4 and color MFP 5.

Figure 3:
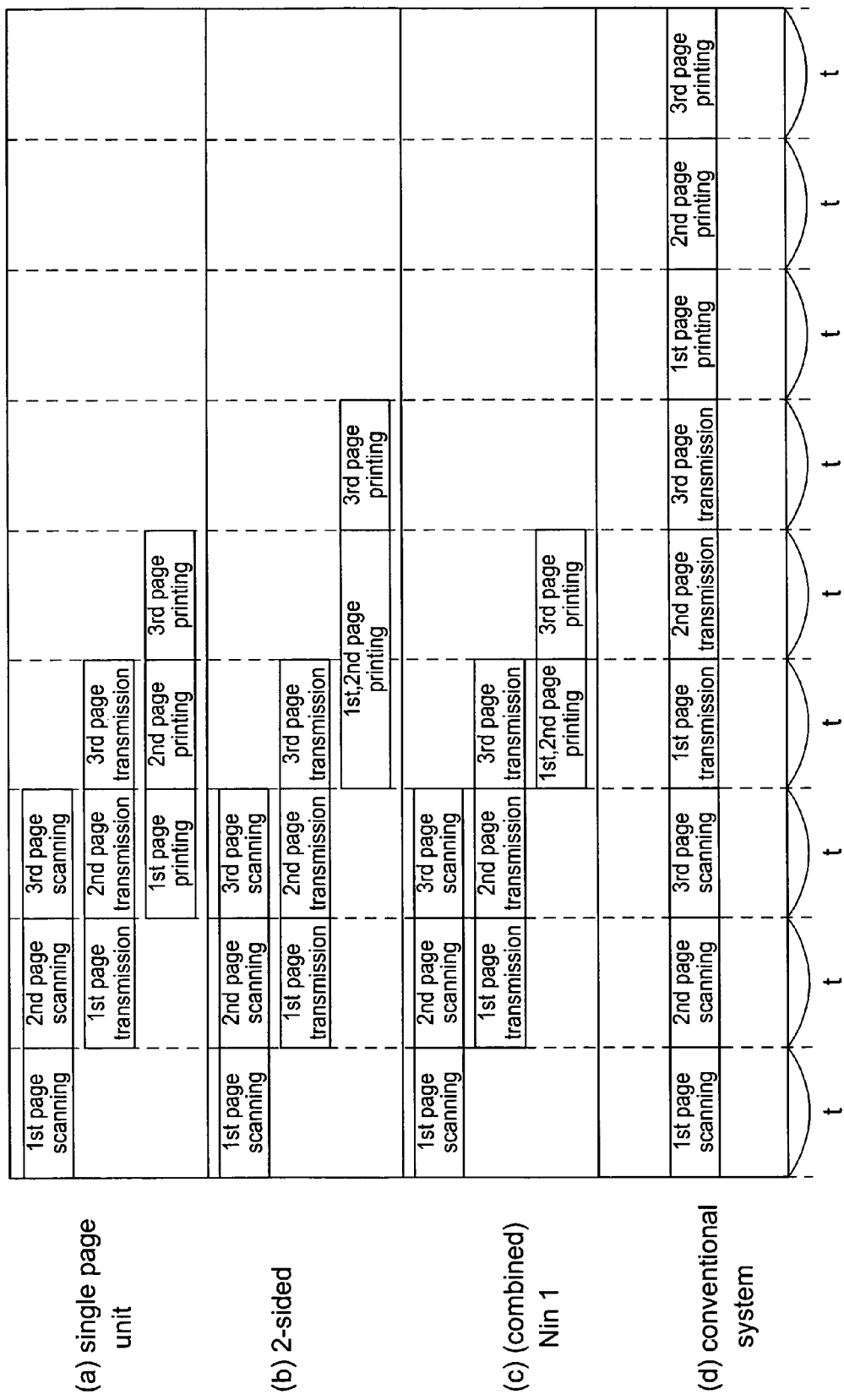
FIG. 3 is a chart showing a copying procedure timing of the remote copying processing method of the present invention.

FIG. 3 is a timing chart illustrating the remote copying method according to the present invention. The timing chart illustrates the copying process applied to a 3-page equal size original document in different transmission styles: (a) transmission in single page unit; (b) transmission in 2-sided form; (c) transmission in combined form (N into 1); and (d) transmission in conventional method.

On the chart, each block for scanning procedure (e.g., "the $1^{st}$ page scanning" in FIG. 3) represents the scanning procedure of original document image at scanner apparatus 2; illustrating the duration of time from the beginning of scanning images till the completion of storing images into the memory 12. Each block for transmission procedure (e.g., "the $1^{st}$ page transmission" in FIG. 3) represents the transmission procedure of scanned image data to the client PC 3 and the automatic transmission procedure from client PC 3 to printers 6 and 7; illustrating the duration of time from the beginning of transmission of images to the client PC till the completion of transmission into printers (including image data combining and compression procedures at client PC). Moreover, each block for printing procedure (e.g., "the $1^{st}$ page printing" in FIG. 3) represents the printing procedure which takes place at printers 6 and 7, illustrating the duration of time from the beginning of reception of data images from the client PC till the completion of printing procedure. The horizontal axis of the chart indicates the passage of time, and the length of each block indicates the time required for each specific process.

Also, each processing time period is not illustrated as an accurate passage of time but rather simplified for the convenience of explanation. For example, the time required to scan a single page original document, the time required to transfer image data of a single page original document, and the time required to print out a single page original document image are all expressed equally as 't', for processing time. However, the time, required for those process, is usually different in actuality. Moreover, scanning time in some cases differs per each page, between color and monochrome images of the original document. In addition, transmission time and printing time tend to differ every page to page, according to the data amount of the compressed image data and the network condition.

In the conventional system transmission method (d), the original document image is read page by page, from first page to third page, at scanner apparatus 2. When the scanning of the entire document is completed, the transmission of the image data of the first page to client PC 3 begins. Then, client PC 3 automatically transfers image data to printers 6 or 7. These transmission process are sequentially executed until all pages of the documents are transmitted. At the completion of the data transmission of all the pages, the image data is placed in memory at printers 6 or 7, according to a predetermined output setting. Therefore, the total copying processing time is 9×t hours.

In a single page unit transmission (a) of the remote copying method, described by this invention, after the completion of scanning of the first page original document image at scanner apparatus 2, the first page image data transmission to client PC 3 starts in parallel with the second page scanning operation. Then, image data is automatically transferred from client PC 3 to printers 6 or 7. Furthermore, in parallel with the third page scanning operation of original document image, the second page image data transmission to client PC 3 begins, and image data is automatically transferred from client PC 3 to printers 6 or 7. In succession, transmission of the third page image data to client PC 3 begins, and automatic transfer is executed from client PC 3 to printers 6 or 7.

Meanwhile, in parallel with the second page scanning operation and the first page transmission operation of the original document image data, printing of the first page image data is executed at printers 6 or 7. Furthermore, in parallel with the third page scanning operation and the second page transmission operation of the original document image, the image data of the second page printing is executed, and the third page image data is then printed. Finally, a total processing time from the beginning of the scanning till the completion of the transmission is 5×t hours.

In 2-sided transmission (b) of the remote copying method, described by this invention, after the completion of scanning of first page original document image at scanner apparatus 2, the first page image data transmission to client PC 3 starts in parallel with second page scanning operation. Then, image data is automatically transferred from client PC 3 to printers 6 or 7. Furthermore, in parallel with the third page scanning operation of the original document image, the second page image data transmission to client PC 3 starts, and image data is then automatically transferred from client PC 3 to printers 6 or 7. In succession, transmission of the third page image data to client PC 3 starts, and automatic transfer is executed from client PC 3 to printers 6 or 7.

Meanwhile, in parallel with the third page transmission operation of original document image to client PC 3, 2-sided printing of the first page and second page image data is executed. Printing procedure in this stage is executed in accordance with an output setting for both sides printing of client PC 3. Then, printing of the third page image data is executed. However, since this last page is an odd numbered page, usual single page printing is performed.

In N into 1 (combined) transmission (c) of the remote copying method, described by this invention, after the completion of scanning of first page original document image at scanner apparatus 2, the first page image data transmission to client PC 3 starts in parallel with the second page scanning operation. Then the image data is automatically transferred from client PC 3 to printers 6 or 7. Furthermore, in parallel with the third page scanning operation of the original document image, the second page image data transmission to client PC 3 begins, and image data is then automatically transferred from client PC 3 to printers 6 or 7. In succession, transmission of the third page image data to client PC 3 begins, and automatic transfer is executed from client PC 3 to printers 6 or 7.

Meanwhile, in parallel with the third page transmission operation of the original document image to client PC 3, N into 1 (combined) printing is executed. Printing procedure in this stage is executed in accordance with an output setting of N in 1 (combined) printing, by using combined image data generated by client PC 3. Then, printing of the third page image data is executed. However, since this last page is an odd numbered page, the printing is performed by using an image data which includes only the $3^{rd}$.

Figure 4:
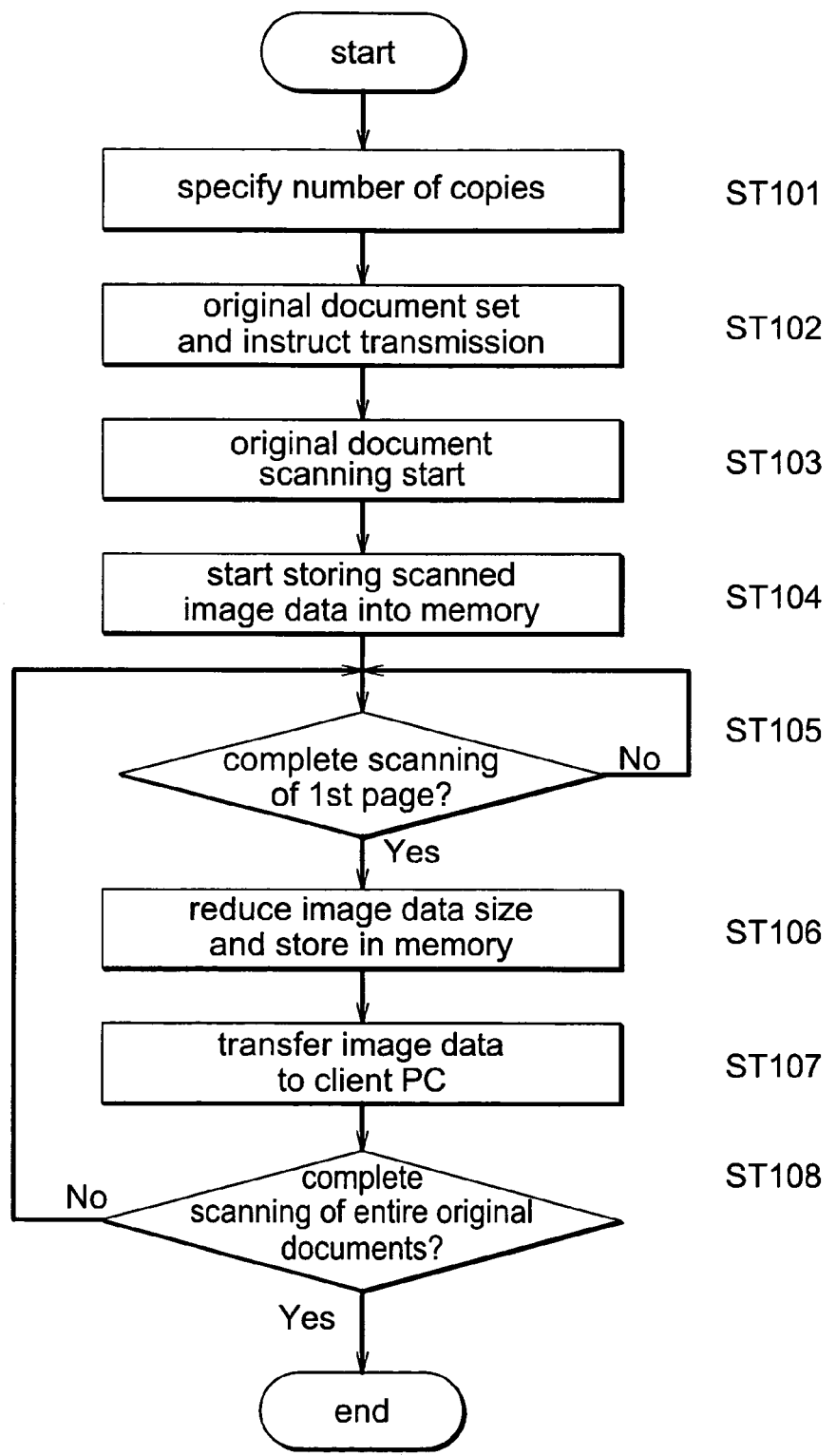
FIG. 4 is a flow chart showing the operation procedure of the scanner apparatus in the embodiment of the present invention.

FIG. 4 is a flow chart illustrating the operating process of the scanner apparatus in applying the remote copying method, described by this invention. First, by operating through the operation key of control panel 20, the operator specifies and enter the number of sets to copy (ST101). Next, the original document is placed on scanner 10, and then the transmission destination (client PC 3 in this case) is selected and instructed from control panel 20 (ST102). Controller 18 receives the transmission destination and instructs scanner 10 to begin scanning (ST103). The image data scanned by scanner 10 is transmitted to memory 12, where the storing operation begins (ST104).

Next, after scanning of the original document image in one-page unit is completed (ST105), the scanned image data is compressed by image processor 14, and the compressed image data is stored in memory 12 (ST106). The compressed image data is then transmitted to the designated transmission destination (client PC 3) through network controller 16 (ST107).

The operation of ST105~ST107 described above is repeatedly executed until the scanning operation of the entire pages of the original document is completed (ST118). Ultimately, when it is determined that the scanning operation of the entire pages of the original document is completed at ST118, scanner apparatus 2 completes the operation procedure.

Figure 5:
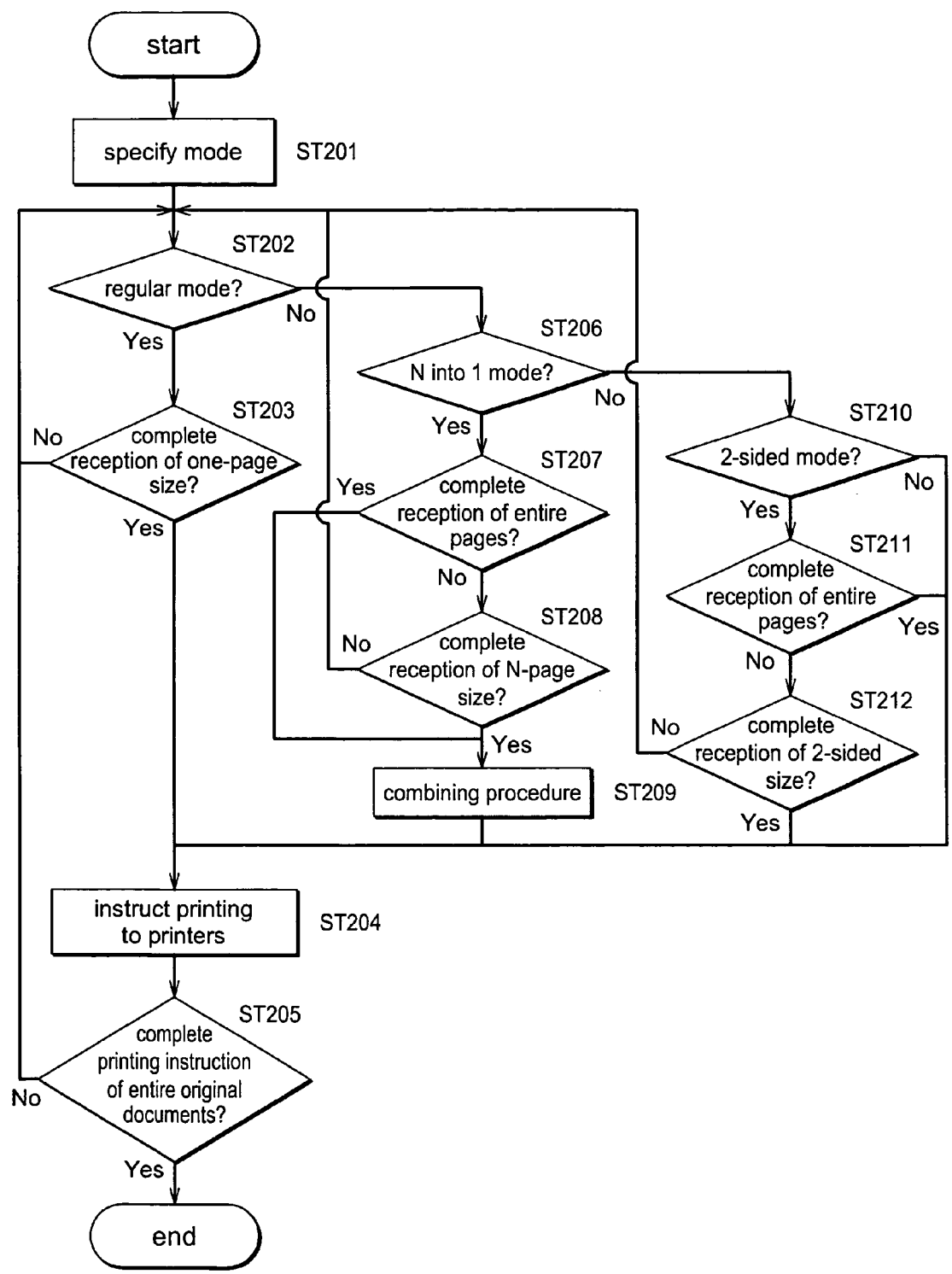
FIG. 5 a flow chart showing the operation procedure of the client PC in the embodiment of the present invention.

FIG. 5 is a flow chart illustrating the operating process of the client PC in performing the remote copying method, described by this invention. First, the operator predetermines an output setting, in document file system 24 of client PC 3, in order to set up the output operation for a printer apparatus (ST201). Based upon the predetermined output setting, an appropriate printer is selected and an output mode is determined. This output mode is selected from "regular (single page unit) mode", "2-sided mode", or "N into 1 (combined) mode" (See "single page unit transmission", "2-sided transmission", and "N-in-1 transmission" of FIG. 3). When "N into 1 mode" is selected at this point, the operator further specifies the number of pages (N pages) for the image data combining procedure.

When "regular mode" is selected for the output mode (ST202), a single page image data of the original document image is received from scanner apparatus 2 (ST203). After that, the image data is automatically transmitted to the printing apparatus while printer driver 26 simultaneously sends the printing instruction to the printing apparatus (ST204). Operations of these ST202~ST204 continue until the completion of the printing instruction for all pages of the original document image (ST205). Ultimately, when the printing instruction for all pages of the original document data image is completed, the operation procedure of client PC 3 ends.

When "N-in-1 mode" is selected for output mode (ST206), whether reception of the entire pages of image data of the original document image is completed (or not) is confirmed (ST207). When the image data reception is incomplete, image data reception operation is executed until the reception of image data for N pages (as previously specified) is completed (ST208). After completion of reception of image data up to N pages, combining procedure for the image data is executed and combined image data is generated (ST209). Then, the combined image data is automatically transmitted to the printing apparatus, while printer driver 26 simultaneously sends the printing instruction to the printing apparatus (ST204). Operations of these ST206~ST209 and ST204 continue until the completion of the printing instruction for all pages of the original document image (ST205).

Meanwhile, when it is determined that the entire pages of image data reception of original document image is completed at ST207, the combining procedure for these image data is executed, since the remaining pages are fewer than the previously specified N pages. Then the combined image data is generated (ST209). Next, the combined image data is automatically transmitted to the printing apparatus, while printer driver 26 simultaneously sends the printing instruction to printing apparatuss (ST204). Ultimately, when the printing instruction for the entire pages of the image data of the original document is completed, the operation procedure of client PC 3 ends.

Furthermore, when "2-sided mode" is selected as the output mode (ST210), whether reception of the entire pages of image data of the original document is completed (or not) is confirmed (ST211). When the reception of image data is incomplete, the image data reception operation is executed until the image data reception for 2-sided page is completed (ST212). When image data reception of 2-sided page is completed, these image data is automatically transmitted to the printing apparatus, while printer driver 26 simultaneously sends the printing instruction to the printing apparatus (ST204). Operations of these ST210~ST212 and ST204 continue until the completion of the printing instruction for all pages of the original document image (ST205).

Meanwhile, when it is determined that the entire pages of original document image is completely received at ST211, the image data is automatically transmitted to the printing apparatus after the completion of image data reception, since the remaining pages are less than a full 2-sided page. Simultaneously, printer driver 26 sends the printing instruction to the printing apparatus (ST204). Ultimately, when the printing instruction for the entire pages of image data of the original document is completed, the operation procedure of client PC 3 ends.

The foregoing embodiment is provided to describe the present invention in detail. However, it is not in any way to be construed as limiting the present invention since these examples are provided as mere examples. For person skilled in the art, needless to say, the various modifications and changes are possible without departing from the scope and spirit of the present invention. For example, remote copying method of the present invention can be applied to various network systems without the limitation of the network configuration illustrated in FIG. 1. And, the network connection is not limited to what is described in FIG. 1, but are connectable to the various devices.

Moreover, scanner apparatus used for the embodiment of the present invention is not limited to a single unit apparatus, but could also be used as a part of multifunction apparatus, that provides functions such as facsimile function, printer function, and other functions. In such cases, for example, even when the scanner apparatus used for the embodiment of present invention has monochrome printing multifunction apparatus, the copying processing can be executed through another color printing apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2003-421348 filed on Dec. 18, 2003, entire content of which is expressly incorporated by reference herein.

What is claimed is:

1. A remote copying method for copying by utilizing a scanner apparatus, a printer apparatus, and a terminal apparatus, the scanner apparatus and the printer apparatus being connected with the terminal apparatus via a network, the copying method comprising:

scanning a plurality of documents at the scanner apparatus;

obtaining image data of the plurality of documents at the scanner apparatus;

storing the obtained image data in a memory of the scanner apparatus;

beginning transmitting the stored image data to the terminal apparatus via the network, before the image data of all of the plurality of documents are stored in the memory of the scanner apparatus;

selecting a printer apparatus from a plurality of printer apparatuses connected to the terminal apparatus via the network;

when an N into 1 copying function is instructed at the terminal apparatus, combining a plurality of pages worth of image data into a single page and transferring the combined image data from the terminal apparatus to the selected printer apparatus via the network every time N pages worth of image data is received by the terminal apparatus; and printing the transferred image data at the printer apparatus, wherein, in the N into 1 copying function, a plurality of pages of the transmitted image data are copied on one page by reducing and arranging the plurality of pages of the image data on the one page.

2. The remote copying method according to claim 1, wherein the terminal apparatus comprises a personal computer.

3. The remote copying method according to claim 1, wherein the terminal apparatus selects a printer apparatus having a color printing function from the plurality of printer apparatuses when a color printing function is instructed at the terminal apparatus, and transfers the image data to the selected printer apparatus having the color printing function.

4. The remote copying method according to claim 1, wherein the terminal apparatus selects a printer apparatus having a 2-sided copying function from the plurality of printer apparatuses when the 2-sided copying function is instructed at the terminal apparatus, and the terminal apparatus transfers the image data to the selected printer apparatus having the 2-sided copying function, wherein, in the 2-sided copying function, the image data is copied on both sides of a paper at the printer apparatus.

* * * * *